United States Patent

Tompsett

[15] 3,646,267

[45] Feb. 29, 1972

[54] CAMERA SYSTEM FOR PRODUCING A TEMPERATURE IMAGE

[72] Inventor: Michael Francis Tompsett, Chelmsford, England

[73] Assignee: English Electric Valve Company Limited, London, England

[22] Filed: July 23, 1970

[21] Appl. No.: 57,681

[52] U.S. Cl. ....................178/7.2, 178/DIG. 8

[51] Int. Cl. ....................H04n 5/30

[58] Field of Search ....................250/83.3 H; 178/7.2, DIG. 8, 178/6.8; 315/10

[56] References Cited

UNITED STATES PATENTS

| | | | |
|---|---|---|---|
| 3,336,585 | 8/1967 | Macovski | 178/7.2 |
| 3,374,392 | 3/1968 | Hadni | 178/DIG. 8 |
| 2,816,954 | 12/1957 | Huffman | 178/DIG. 8 |
| 2,929,869 | 3/1960 | Hines et al. | 178/6.8 |
| 3,499,109 | 3/1970 | Kihara et al. | 178/7.2 |

*Primary Examiner*—Robert L. Griffin
*Assistant Examiner*—George G. Stellar
*Attorney*—Baldwin, Wight and Brown

[57] ABSTRACT

Electron discharge camera tube apparatus for translating into picture signals a temperature image includes a camera tube having an electrode of pyroelectric material upon which the image is interruptedly projected. The interruptions are sufficiently long to permit the temperature image last produced to cool substantially during an interruption. The electrode is scanned with both a high- and a low-energy ray. The output signal representative of the temperature image is derived from the low-energy ray during the interruptions.

10 Claims, 3 Drawing Figures

Figure 1:
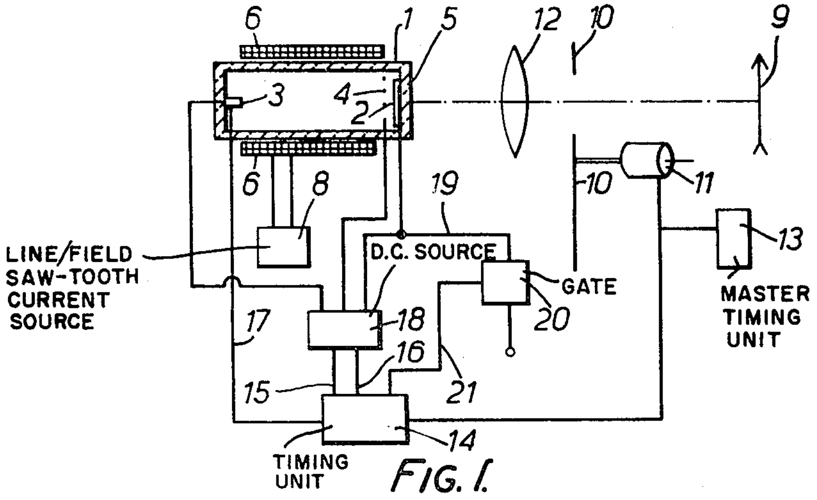

INVENTOR
Michael Francis Tompsett
BY
Baldwin Wight Diller & Brown
ATTORNEYS

CAMERA SYSTEM FOR PRODUCING A TEMPERATURE IMAGE

This invention relates to electron discharge camera tube apparatus hereinafter termed, simply, "camera tube apparatus." The main object of the invention is to provide improved camera tube arrangements which will develop satisfactory picture signals from what will herein be referred to as "temperature images." An ordinary camera tube such, for example, as an Image Orthicon or a Vidicon as customarily employed for television transmission of course produces picture signals corresponding with the different points of an image in visible light. The most important object of this invention is to provide improved camera tube apparatus which will produce satisfactory picture signals corresponding with the different points of an image in heat radiation, e.g., infrared radiation. Just as, in television transmission, an ordinary television transmitting camera tube translates a visible light image of a subject of transmission focused upon it into picture signals, so the main object of the present invention is to solve the difficult problem of providing improved camera tube apparatus which will satisfactorily translate into picture signals, heat images of a subject of transmission focused upon them. Such images will hereinafter be referred to as "temperature images." However although, as stated, the most important object of the invention is to provide improved apparatus for translating temperature images into picture signals the application of the invention is not, theoretically at any rate, limited to apparatus employing such tubes but, as will be apparent later, is applicable to any camera tube apparatus in which the camera tube is one wherein an electrical image in the form of a voltage distribution and corresponding to an original image in any form of energy, is produced over an area of an electrode of the tube and is required to be translated into output signals without destroying or seriously weakening said electrical voltage distribution image. However, because it is the most important application of the invention, the particular description to be given later herein will be confined to camera tube apparatus for translating temperature images into picture signals.

In carrying out the present invention as applied to a temperature image translating camera tube apparatus, use is made of a known property possessed by what are called pyroelectric materials. If a body of pyroelectric material is subjected to temperature changes, changes in the internal polarization of the material are produced and, resulting from these, there are produced changes in the electrical charge conditions at the surface of the body. If therefore, a thin slice of pyroelectric crystal has a temperature image focused thereon there will be produced across the surface thereof an electrical charge image which corresponds with and will hereinafter be referred to as a voltage distribution image. If this image is scanned by a cathode ray in such manner as to read off the voltage distribution image without destroying said image or even imposing any appreciable loading thereof, one of the more difficult problems in the way of providing a satisfactory temperature image translating tube will have been solved—namely the problem of producing picture signals of practically useful magnitude and reasonable fidelity from the relatively feeble temperature images which are usually all that are available.

According to this invention an electron discharge camera tube apparatus for translating into picture signals an image of a subject of transmission comprises a camera tube having an electrode adapted to produce from the projection of said image thereon a corresponding image constituted by a voltage distribution image; means for interruptedly projecting the image of said subject upon said electrode, each of the interruptions being of sufficient duration to permit the voltage distribution image last produced substantially to reduce in intensity during said interruption; means for scanning said electrode with a relatively low-energy scanning cathode ray during first short scanning periods occurring at or near one end of each interruption; means for scanning said electrode with a relatively high-energy cathode ray during second short scanning periods occurring at or near the other end of each interruption; and means for deriving during and from the scanning effected in said first periods output signals representative of the image of the subject of transmission. To quote practical but nonlimiting figures the scanning periods might be of 0.02 of a second each, the periods of interruption of 0.1 of a second each and the periods between said periods of interruption also of 0.1 of a second each.

According to a feature of this invention an electron discharge camera tube apparatus for translating into picture signals a temperature image of a subject of transmission comprises a camera tube having an electrode adapted to produce from the projection of said image thereon a corresponding image constituted by a voltage distribution image; means for interruptedly projecting said temperature image upon said electrode, each of the interruptions being of sufficient duration to permit the temperature image last produced to cool substantially during said interruption; means for scanning said electrode with a relatively low-energy scanning cathode ray during first short scanning periods occurring at or near one end of each interruption; means for scanning said electrode with a relatively high-energy cathode ray during second short scanning periods occurring at or near the other end of each interruption; and means for deriving during and from the scanning effected in said first periods output signals representative of said temperature image.

Preferably each scanning of the electrode by a relatively high-energy cathode ray is followed almost immediately during a third short scanning period by an additional scanning of said electrode by a relatively low-energy scanning cathode ray.

A preferred form of apparatus in accordance with the invention comprises a camera tube including a target electrode adapted to produce the voltage distribution image, an electron gun adapted to produce a cathode ray for scanning the target electrode, a so-called field mesh adjacent said target and on the side thereof towards said gun, and means for taking off signals derived by scanning said target electrode; means for alternately applying one or other of two sets of potentials to the cathode of said gun, said field mesh and said target electrode the potentials of each set being so chosen that, when one set is applied, the cathode ray is a low-energy ray scanning said target electrode under conditions of so-called cathode potential stabilization while, when the other set is applied the cathode ray is a high-energy ray scanning said target electrode under conditions of so-called anode or collector potential stabilization and a rotatable shutter interposed between the subject of transmission and said target electrode and adapted to interrupt the projection of said subject upon said target electrode for approximately one-half of each rotation.

Preferably means are provided for blanking off the cathode ray except during the short periods in which scanning of the target electrode is taking place.

Preferably also means are provided for blocking the output signal circuit of the tube except during periods in which the target electrode is scanned by a ray of low-energy electrons to develop picture signals.

The means for taking off signals derived by scanning the target electrode may include a signal plate forming part of the target electrode structure or an added electron collecting electrode positioned and arranged to collect a return electron flow from the target electrode back towards the gun. In other words the signals derived by scanning the target electrode may be derived in a manner similar to that adopted in the well-known Vidicon type of camera tube (i.e., from a signal plate in the target electrode structure) or they may be derived in a manner similar to that adopted in the well known Image Orthicon and Isocon types of tube (i.e., by means of an added collector electrode for the return electron flow). Where an added collector electrode is employed it is preferably the first dynode of an electron multiplier, as well known per se in Image Orthicon practice.

In a temperature image translating apparatus in accordance with the invention the target electrode of the tube is of pyroelectric material, preferred pyroelectric materials being triglycine sulfate, lithium niobate, sodium nitrate and strontium barium niobate.

Figure 2:
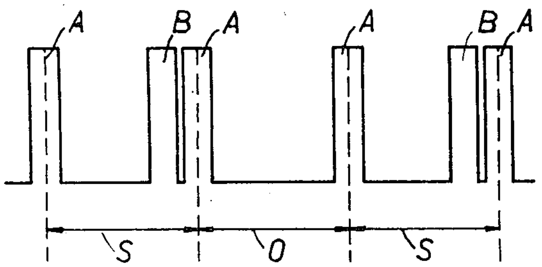
Figure 3:
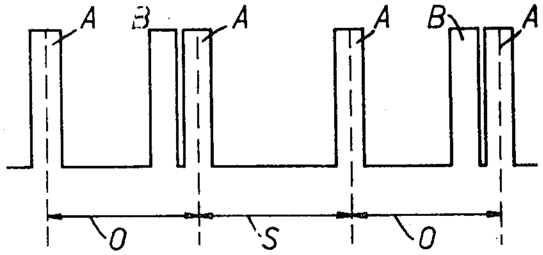

The invention is illustrated in and further explained in connection with the accompanying drawings in which FIG. 1 is a much simplified diagrammatic representation of a preferred form of a temperature image translating apparatus in accordance with the invention and FIGS. 2 and 3 are explanatory graphical figures.

Referring to FIG. 1 the apparatus therein shown comprises a camera tube 1 the electrodes of which include a target electrode 2 of suitable pyroelectric material such as triglycine sulphate, a scanning electron gun structure of normal well-known construction and represented conventionally at 3 and, between the gun and the target electrode, a field mesh 4 which is adjacent the target electrode and parallel thereto. In the illustrated embodiment of FIG. 1 the target electrode has a very thin metal backplate 5 to act as a signal output electrode as in a Vidicon camera tube. Scanning deflection means for causing the cathode ray to scan the target electrode in a television line raster are provided and, in FIG. 1, are illustrated as electromagnetic, being constituted by the deflecting coil system 6. A source of line and field deflection sawtooth currents as known per se is represented by the block 8.

The arrow 9 represents a subject of transmission and a temperature image thereof is projected upon the target electrode 2 via a rotating shutter disc 10 driven by an electric motor 11. The lens 12 is a simplified representation of an image projection system for focusing the temperature image on the target electrode 2. The shutter disc has an opening or window of such dimensions and location as to cut off the temperature image from reaching the target electrode for about one-half of each revolution. The ratio of the period of "image passed" to that of "image stopped" is not critical, the requirement being merely that the target electrode should be able to cool off substantially during each "image stopped" interval. The shutter disc may be rotated at, for example, 300 r.p.m. so that one revolution is accomplished in 0.2 sec. for about half of which time the image is shut off. The rotation of the shutter disc is controlled by a master timing unit represented by the block 13 which also controls a further timing unit 14.

The further timing unit 14 provides on lead 15 a periodic output of pulses each of duration which is short in comparison with the time taken by half a revolution of the shutter disc 10, e.g., each such pulse may have a duration of (say) 0.02 sec. These pulses are produced at intervals of about 0.1 sec. (assuming the shutter disc to execute one rotation in 0.2 sec.) and are timed to occur at about the times of change of the shutter disc from the "image passed" condition to the "image stopped" condition and also at about the times of change of said shutter disc from the "image stopped" condition to the "image passed" condition. These pulses are represented at A in FIG. 2. The timing unit 14 also provides, on lead 16, pulses, represented at B in FIG. 2, of the same length as pulses A but occurring at intervals of 0.2 sec., each almost immediately before alternate ones of the pulses A. In FIG. 2 the "image passed" periods are indicated by the letter O and the "image stopped" periods by the letter S.

The cathode ray in the tube is cut off for most of the time but is "brightened up" during the presence of the pulses A and B so that, during these times, the ray scans the target electrode 2 through the field mesh 4. The way in which this control action to brighten up the ray in the tube 1 is effected is diagrammatically represented by the lead 17 from the timing unit 14 to the gun structure 3 (normally to the control grid thereof—not separately shown). The pulses A and B also control in any convenient way (not shown) the operating DC potentials supplied from a source 18, to the cathode of the gun, the field mesh and the target electrode. The control is such that, during the presence of the pulses A, the cathode and the target electrode are both at zero or earth potential while the field mesh is at a suitable positive potential (e.g., +300 v.) such that, during the presence of the said pulses A, there is cathode potential stabilization and the target electrode is scanned by a low-energy electron ray; whereas, during the pulses B, the target electrode and the field mesh are both at zero or earth potential while the cathode is at a suitable negative potential (e.g., −300 v.) such that, during the presence of the said pulses B, there is anode or collector potential distribution and the target electrode is scanned by a high-energy electron ray. It is not, theoretically, absolutely essential to provide those alternate pulses A (and the consequent short scanning periods with cathode potential stabilization) which almost immediately follow the pulses B but it is much preferred to do so. This is because although the high-velocity electron bombardment of the target electrode by the cathode ray during scanning with anode or collector potential stabilization (i.e., during pulses) drives off secondary electrons and should (theoretically) produce a uniform potential distribution across the target electrode, in practice the degree of uniformity of potential distribution actually produced is highly dependent upon the physical condition and material of the target electrode. Considerably better results are therefore obtained if each scanning operation with anode or collector potential stabilization (effected in order to get rid of electrons deposited on the target electrode during the preceding scanning operation with cathode potential stabilization 0.1 sec. earlier) is followed almost immediately by an additional scanning operation with cathode potential stabilization.

Output signals resulting from scanning will appear on the output lead 19 connected to the back plate 5 of the target electrode. However very much the best output signals produced will be those obtained during scanning by the low-energy electron ray to develop output signals i.e., during those of the pulses A (alternate pulses A) which are not almost immediately preceded by a pulse B. It is accordingly best to open circuit the signal output circuit at other times and, to this end, there is interposed in said output circuit an electronic gage 20 which is open circuited at such other times by timed relatively long blocking pulses produced by the timing unit 14 and fed over lead 21.

In the illustrated embodiment of FIG. 1 output signals are taken, in manner similar to that adopted in ordinary Vidicon camera tube practice, from the back signal plate 5 of the target electrode 2. It is, however, equally possible to derive output signals by means of an electrode (not shown) positioned to receive return electrons as in Image Orthicon camera tube practice. Such an electrode may conveniently be arranged near the electron gun and may be—again as in Image Orthicon camera tube practice—the first dynode of a multiple-dynode electron multiplier arranged round the gun, final output being taken from the last dynode of said multiplier. Such Image Orthicon camera tube practice is too well known per se for illustration of this modified way of embodying the present invention to be necessary here.

The cycle of operations illustrated graphically by FIG. 2 is not the only cycle of operations which can be used to carry out the invention and a cycle of operations as illustrated by FIG. 3 could equally well be used with suitable applied operating potentials. As like references are used in FIGS. 2 and 3 the latter figure is thought to be self-explanatory and to need no further explanation. Instead of applying zero potential to the cathode and target electrode and pulsing the field mesh positively to, (say) 300 v. to achieve cathode potential stabilization and obtaining anode or collector potential stabilization by applying zero potential to the field mesh and target electrode and pulsing the cathode negatively at (say) −300 v. (all as already described) the latter condition may be obtained by applying the same positive potential (say +300 v.) to the field mesh and target electrode while the cathode is at zero potential and the former condition obtained by leaving the cathode and field mesh potentials unchanged and pulsing the target electrode down to zero potential.

I claim:

1. An electron discharge camera tube apparatus for translating into picture signals an image of a subject of transmission, comprising in combination:

a camera tube including electrode means for producing a voltage distribution image in response to exposure thereof to an image, scanning electron means for scanning said electrode means, and output means for producing picture signals in response to voltage distribution images scanned by said scanning electron means;

means for projecting the image of a subject to said electrode means and including means for periodically interrupting such projection to provide alternate periods of projection and interruption;

means for causing said scanning means periodically to scan said electrode means at a selected high intensity sufficient to produce a substantially uniform potential thereacross at least prior to the beginning of each projection period and thereafter further to scan said electrode means at a low intensity substantially less than said selected high intensity at a later time during each such projection period after the voltage distribution image indicative of the projected image has been built up and at sufficiently low intensity to produce a picture signal output from said output means; and means for passing the picture signal obtained from said output means only during said further scans.

2. An electron discharge camera tube apparatus for translating into picture signals an image of a subject of transmission, comprising in combination;

a camera tube including electrode means for producing a voltage distribution image in response to exposure thereof to an image, scanning electron means for producing an electron ray and for scanning said electrode means therewith, and output means for producing picture signals indicative of voltage distribution images only in response to selected low energy level scanning of said electrode means by an electron ray from said scanning electron means;

means for controlling said camera tube to scan said electrode means at regular, time-separated intervals with electron ray energy of level substantially higher than said selected low energy level and at regular, time-separated intervals with electron ray energy of said low level wherein at least one scan at said selected low energy level occurs between each successive pair of high energy scans and in timed relation thereto to provide a time period of no scanning immediately preceding such scan at said selected low energy level; and means for projecting images of a subject onto said electrode means during time-separated intervals occurring substantially only during said time periods of no scanning immediately preceding scans at said selected low energy level.

3. An electron discharge camera tube apparatus as defined in claim 2 wherein said means for controlling causes scanning of said electrode means at said low energy level at twice the rate of scanning thereof at said high energy level, said time periods of no scanning being defined between alternate pairs of successive low energy scans.

4. An electron discharge camera tube apparatus for translating into picture signals a temperature image of a subject of transmission comprising:

a camera tube having an electrode adapted to produce from the projection of said image thereon a corresponding image constituted by a voltage distribution image;

means for interruptedly projecting said temperature image upon said electrode, each of the interruptions being of sufficient duration to permit the temperature image last produced to cool substantially during said interruption;

pulse timing means for controlling operating DC potentials applied to the camera tube so that said electrode is scanned with a relatively low-energy scanning cathode ray during first short scanning periods occurring at or near one end of each interruption while a voltage distribution image is present on said electrode and for controlling the operating DC potentials so that said electrode is scanned with a relatively high-energy cathode ray during second short scanning periods occurring at or near the other end of each interruption; and means for deriving during and from the scanning effected only in said first periods output signals representative of said temperature image.

5. An apparatus as claimed in claim 4 wherein said timing means also controls the operating DC potentials so that each scanning of the electrode by a relatively high-energy cathode ray is followed almost immediately during a third short scanning period by an additional scanning of said electrode by a relatively low-energy scanning cathode ray.

6. An electron discharge camera tube apparatus for translating into picture signals an image of a subject of transmission, said apparatus comprising:

a camera tube having an electrode adapted to produce from the projection of said image thereon a corresponding image constituted by a voltage distribution image;

means for interruptedly projecting the image of said subject upon said electrode, each of the interruptions being of sufficient duration to permit the voltage distribution image last produced substantially to reduce in intensity during said interruption;

pulse timing means for controlling operating DC potentials applied to the camera tube so that said electrode is scanned with a relatively low-energy scanning cathode ray during first short scanning periods occurring at or near one end of each interruption while a voltage distribution image is present on said electrode and for controlling the operation DC potentials so that said electrode is scanned with a relatively high-energy cathode ray during second short scanning periods occurring at or near the other end of each interruption; and means for deriving during and from the scanning effected only in said first periods output signals representative of the image of the subject of transmission.

7. A temperature image translating apparatus in accordance with claim 6 wherein the target electrode is of a pyroelectric material.

8. An apparatus as claimed in claim 6 wherein said electrode is a target electrode and said tube also includes an electron gun adapted to produce a cathode ray for scanning the target electrode, a so-called field mesh adjacent said target electrode and on the side thereof towards said gun, and means for taking off signals derived by scanning said target electrode; said timing means alternately applying one or other of two sets of potentials to the cathode of said gun, said field mesh and said target electrode the potentials of each being so chosen that, when one set is applied, the cathode ray is a low-energy ray scanning said target electrode under conditions of so-called anode or collector potential stabilization; and said means for projecting includes a rotatable shutter interposed between the subject of transmission and said target electrode and adapted to interrupt the projection of said subject upon said target electrode for approximately one-half of each rotation.

9. An apparatus as claimed in claim 8 wherein said timing means blanks off the cathode ray except during the short periods in which scanning of the target electrode is taking place.

10. An apparatus as claimed in claim 8 wherein an electronic gate is provided for blocking the output signal circuit of the tube except during periods in which the target electrode is scanned by a ray of low-energy electrons to develop picture signals.

* * * * *